US011319093B2

(12) United States Patent
Rose et al.

(10) Patent No.: US 11,319,093 B2
(45) Date of Patent: May 3, 2022

(54) DEPLOYMENT MECHANISM FOR REFLECTOR ANTENNA SYSTEM

(71) Applicant: Eagle Technology, LLC, Melbourne, FL (US)

(72) Inventors: Christopher L. Rose, Palm Bay, FL (US); Greg Apotsos, Melbourne Beach, FL (US)

(73) Assignee: EAGLE TECHNOLOGY, LLC, Melbourne, FL (US)

(*) Notice: Subject to any disclaimer, the term of this patent is extended or adjusted under 35 U.S.C. 154(b) by 339 days.

(21) Appl. No.: 16/403,893

(22) Filed: May 6, 2019

(65) Prior Publication Data
US 2020/0354087 A1    Nov. 12, 2020

(51) Int. Cl.
*B64G 1/22*    (2006.01)
*B64G 1/66*    (2006.01)
*B64G 1/10*    (2006.01)
*H01Q 1/28*    (2006.01)

(52) U.S. Cl.
CPC ............... *B64G 1/222* (2013.01); *B64G 1/10* (2013.01); *B64G 1/66* (2013.01); *H01Q 1/288* (2013.01)

(58) Field of Classification Search
CPC . B64G 1/222; B64G 1/66; B64G 1/10; H01Q 1/288; H01Q 1/08; H01Q 1/1235; H01Q 1/1228; H01Q 15/161; H01Q 15/20; E04B 1/19
See application file for complete search history.

(56) References Cited

U.S. PATENT DOCUMENTS

| | | | |
|---|---|---|---|
| 3,496,687 A * | 2/1970 | Greenberg | H01Q 15/161 52/109 |
| 4,176,360 A | 11/1979 | Leavy et al. | |
| 4,785,309 A | 11/1988 | Gremillion | |
| 5,218,375 A | 6/1993 | Hillman | |
| 5,315,795 A * | 5/1994 | Chae | B66F 11/00 343/874 |
| 5,857,648 A * | 1/1999 | Dailey | B64G 1/222 244/172.6 |
| 5,864,324 A | 1/1999 | Acker et al. | |
| 6,384,800 B1 * | 5/2002 | Bassily | H01Q 1/288 343/882 |

(Continued)

FOREIGN PATENT DOCUMENTS

JP    H05235632 A    9/1993
JP    H05299930 A    11/1993

*Primary Examiner* — Medhat Badawi
*Assistant Examiner* — Vicente Rodriguez
(74) *Attorney, Agent, or Firm* — Fox Rothschild LLP; Carol E. Thorstad-Forsyth; Robert J. Sacco

(57) ABSTRACT

Deployable reflector system includes a boom which is extended from a rigid base. A reflector support structure is secured to a carrier end of the boom opposed from the base. The reflector support structure is configured to transition from a collapsed configuration to an expanded configuration. A tension element coupled at one end to the reflector support structure extends along a length of the boom to the base. The tension element is tensioned as a result of extending the boom, whereby a tension force is provided. The reflector support structure is transitioned from the collapsed configuration to the expanded configuration responsive to the tension force, whereby the same actuator mechanism that extends the boom also expands the reflector support structure.

17 Claims, 8 Drawing Sheets

(56) References Cited

U.S. PATENT DOCUMENTS

| | | | |
|---|---|---|---|
| 6,782,667 B2 | 8/2004 | Henderson | |
| 8,381,460 B1 * | 2/2013 | McDermott | E01D 21/00 |
| | | | 52/118 |
| 8,590,961 B2 * | 11/2013 | Breidenbach | B62D 35/001 |
| | | | 296/180.4 |
| 8,683,755 B1 * | 4/2014 | Spence | B64G 1/222 |
| | | | 52/108 |
| 8,905,702 B1 | 12/2014 | Jedneak | |
| 9,120,583 B1 | 9/2015 | Spence et al. | |
| 10,131,452 B1 * | 11/2018 | Rohweller | H01Q 1/1235 |
| 2004/0113020 A1 * | 6/2004 | Wang | B64G 1/285 |
| | | | 244/165 |
| 2008/0283670 A1 * | 11/2008 | Harvey | B64G 1/222 |
| | | | 244/172.6 |
| 2019/0144139 A1 * | 5/2019 | Marks | H01Q 1/288 |
| | | | 244/172.6 |

* cited by examiner

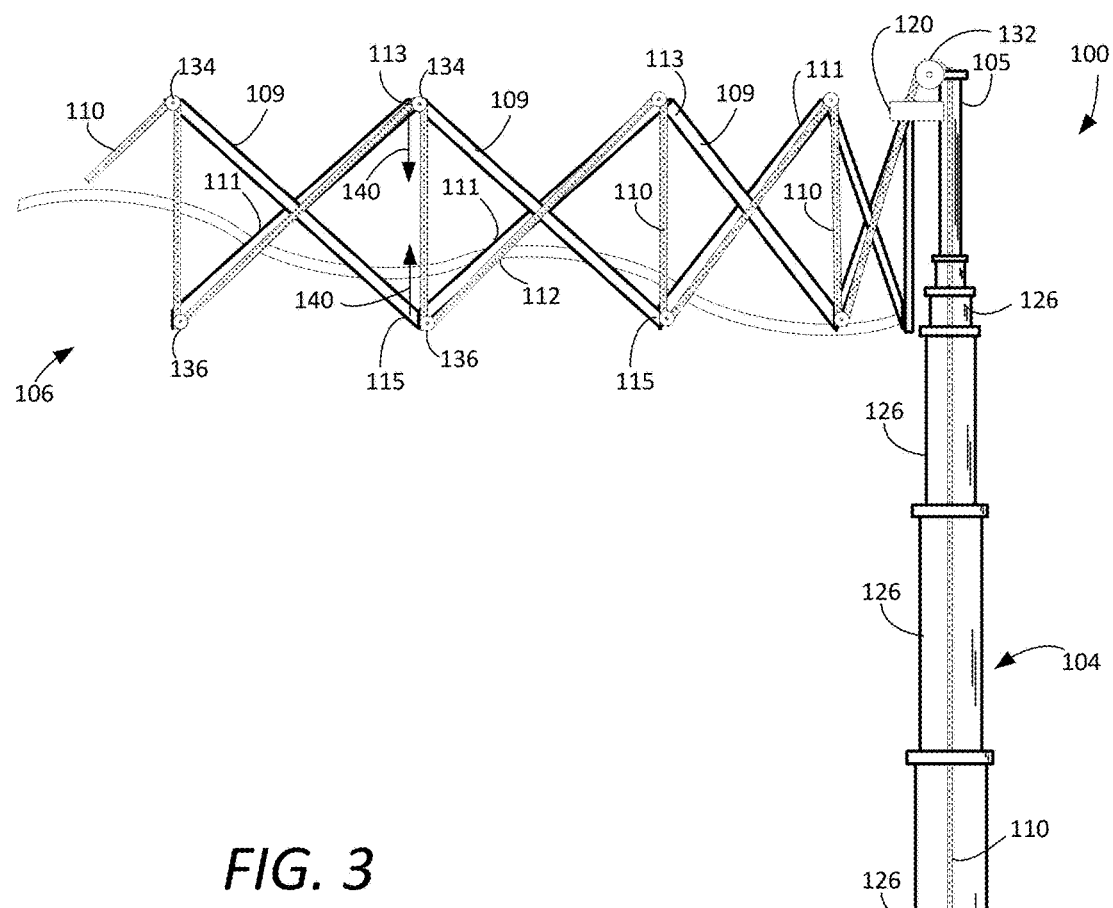
FIG. 3
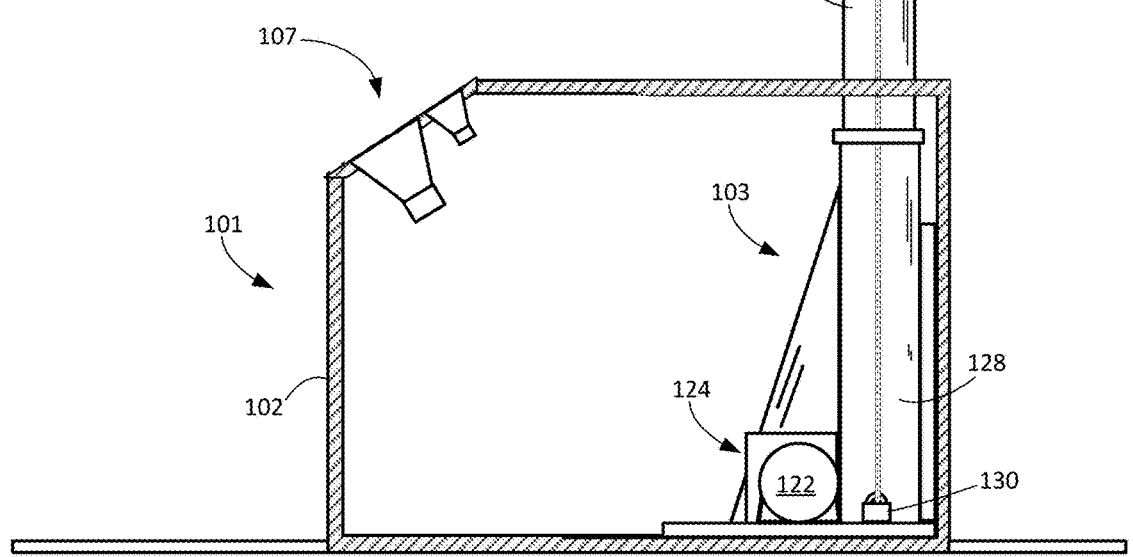

US 11,319,093 B2

DEPLOYMENT MECHANISM FOR REFLECTOR ANTENNA SYSTEM

BACKGROUND

Statement of the Technical Field

The technical field of this disclosure concerns reflector antenna systems, and more particularly, deployment mechanisms for deployable antenna reflectors.

Description of the Related Art

The related art concerns methods and systems for deploying antenna reflectors. In satellites which use reflector type antenna systems it is often necessary to provide some mechanism whereby an antenna reflector is positioned away from the spacecraft bus and the reflector surface is deployed. These systems often involve an extendable boom of some type, and a mechanical system to facilitate deployment of the actual reflector surface. With small satellite systems in particular, it is important for the designer to minimize the overall weight and volume of the system components which are used to deploy the antenna. Other considerations relating to such deployment systems can involve overall cost and the need to reduce potential failure modes.

The boom and reflector surface deployment mechanisms in conventional satellites are often highly customized to the particular deployment operation that they are designed to perform. As such, conventional satellites rely on a minimum of two separate drive mechanisms to facilitate the extension of the boom and the deployment of the reflector surface.

SUMMARY

This document concerns a deployable reflector system. The system includes a boom which is configured to transition from a stowed condition to deployed condition. In the stowed condition, the boom is compactly arranged for stowage in a confined space, such as a spacecraft. In the deployed condition, the boom is extended to define an elongated boom having a predetermined length. The boom extends from a rigid base end and includes a carrier end which is disposed distal from the rigid base when the boom is extended. An actuator mechanism, which may include a motor and a drive train, is provided as part of the deployable reflector system. The actuator mechanism is arranged to urge the boom from the compact stowed condition to the deployed condition.

A reflector support structure is secured to the carrier end of the boom. The reflector support structure is configured to transition from a collapsed configuration to an expanded configuration. In the collapsed configuration, the reflector support structure is arranged for compact stowage. In the expanded configuration the reflector support structure is expanded so as to support a reflector surface. The reflector surface will have a predetermined reflector shape which may be flat or curved so as to direct a beam of RF energy.

A tension element, such as a cord or a tape, is coupled at one end to a portion of the reflector support structure. The tension element is configured to extend along a length of the extended boom to a tension guide element disposed at the carrier end of the boom. In some scenarios, this tension guide element can be a pulley or a cam-shaped member that is configured to change a direction of the tension force. An opposing end of the tension element can be securely attached to the rigid base. The tension element is arranged so as to be automatically urged to a condition of tension as a result of extending the boom, whereby a tension force is provided. The reflector support structure is configured to automatically transition from the collapsed configuration to the expanded configuration responsive to the tension force. With the foregoing arrangement, no separate actuator mechanism is needed to facilitate expansion of the reflector support structure. The same actuator mechanism that is used to facilitate extension of the boom is also used to facilitate the expansion of the reflector support structure.

The boom can include any suitable arrangement that is capable of transitioning from the stowed configuration to the deployed or extended configuration. According to one aspect, the boom can be comprised of a plurality of sections which are nested together in the stowed condition, and which extend substantially end to end in the deployed condition. In other scenarios, the boom is comprised of a plurality of sections which are configured to operate in accordance with a scissoring action. Alternatively, the extendable boom may be comprised of a spoolable extensible member.

In some scenarios, the reflector support structure described herein is a perimeter truss assembly. As such, the perimeter truss assembly can be comprised of a plurality of link members which define a pantograph. When the tension force is applied, the pantograph can be extended to expand the reflector support structure to its full size. In other scenarios, the reflector support structure may be comprised of a plurality of foldable ribs. When unfolded as a result of the application of the tension force, the ribs are disposed radially with respect to a central axis of the reflector support structure.

The solution also includes a method for deploying a reflector system as described above. As such, the method can involve using an actuator to extend a boom from a stowed configuration to an extended configuration. As a result of extending the boom, a tension element is urged to a condition of tension. This can be accomplished as described above, by taking up a slack in the tension element as a result of extending the boom. The condition of tension is advantageously used to urge a reflector support structure to transition from a collapsed configuration, in which the reflector support structure is arranged for compact stowage, to an expanded configuration, in which the reflector support structure supports a reflector surface in accordance with a predetermined reflector shape.

According to one aspect, the tension element described herein can include a first portion disposed in alignment with a boom central axis, and a second portion extending along a part of the reflector support structure. Consequently, a length of the first portion will increase and a length of the second portion will decrease as a result of extending the boom. The method can further involve using the decreased length of the second portion to urge the reflector support structure to the expanded configuration.

In some scenarios, the method can involve transitioning the reflector to an expanded configuration by controlling relative positions of a plurality of pantographic link members which form a pantograph hoop. In other scenarios, the method can involve transitioning the reflector to the expanded configuration by unfolding a plurality of foldable ribs so that they extend radially with respect to a central axis of the reflector support structure.

BRIEF DESCRIPTION OF THE DRAWINGS

This disclosure is facilitated by reference to the following drawing figures, in which like numerals represent like items throughout the figures, and in which:

FIG. 3 is a more detailed drawing of the reflector in FIGS. 1 and 2, shown in a partially deployed state.

DETAILED DESCRIPTION

Figure 1:
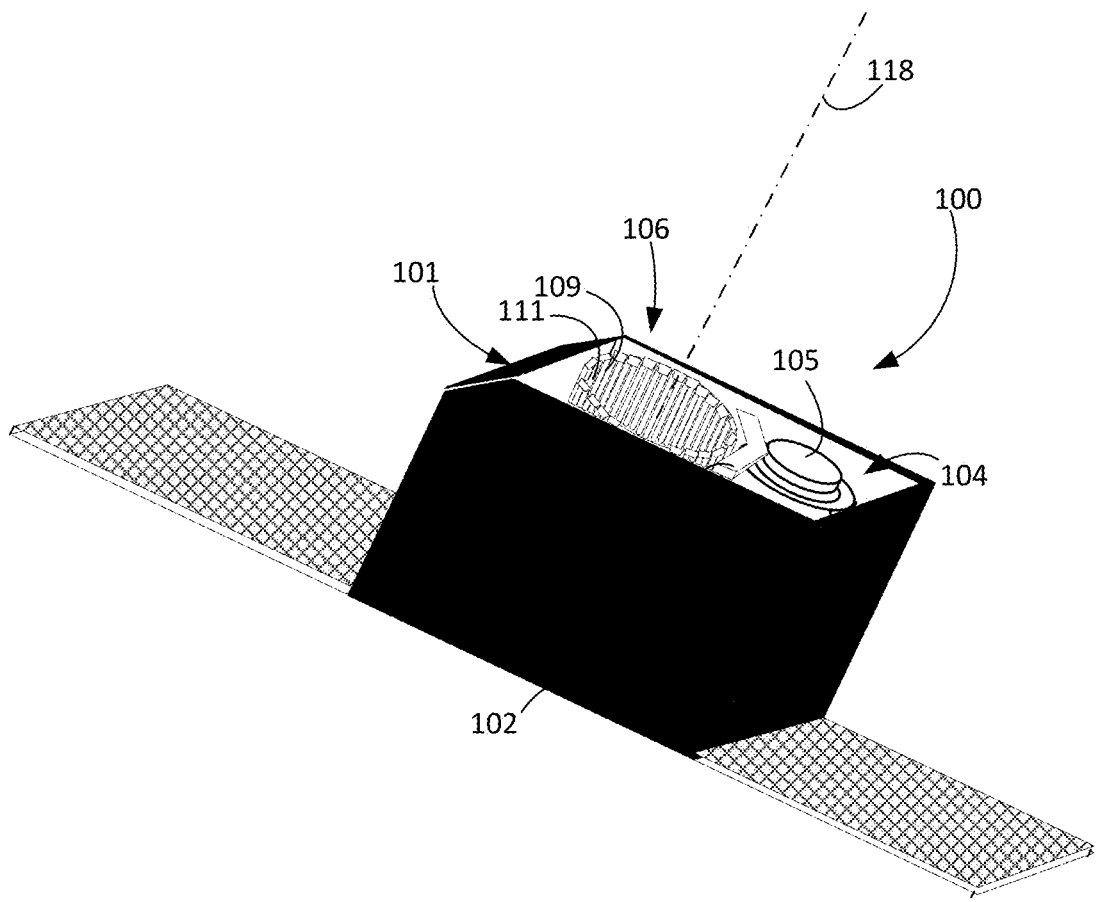
FIG. 1 is an isometric drawing of a reflector system in a stowed state, which is useful for understanding certain aspects of a solution described herein.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

Deployment of satellite reflectors currently relies on a minimum of two separate actuators or drive mechanisms. One or more of these drive mechanisms is/are designed to facilitate boom deployment and one or more additional drive mechanism(s) facilitate deployment of the reflector surface. This conventional arrangement increases the complexity of the overall deployment system and increases the weight of the payload. A solution to this problem is disclosed in which a single actuator mechanism facilitates dual functions, namely deployment of the boom and deployment of the reflector.

Figure 2:
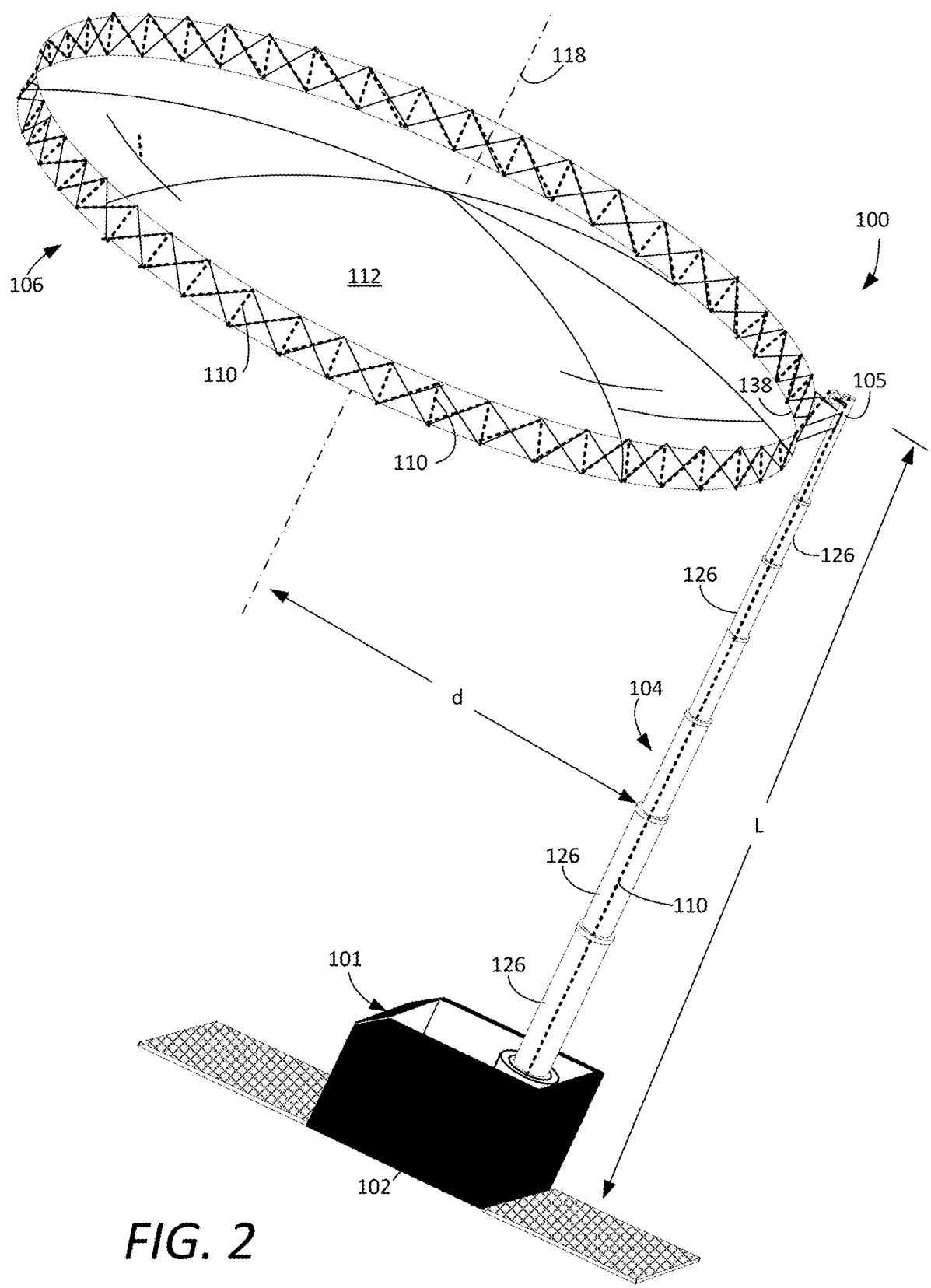
FIG. 2 is an isometric drawing of the reflector system in a deployed state, which is useful for understanding certain aspects of a solution described herein.

Shown in FIGS. 1-3 is a deployable reflector system 100 that is useful for understanding certain aspects of a solution for deploying a boom and a reflector using a single actuator or drive mechanism. In some scenarios, the reflector system 100 can be installed in a housing 102 or along the exterior of the bus associated with a spacecraft 101. The housing 102 can contain various types of equipment, including radio communication equipment. The radio communication equipment can include a radio transceiver (not shown) and a radio frequency (RF) feed 107. The RF feed 107 can be used for illuminating an RF reflector with RF energy in a transmit mode, and for receiving RF energy which is focused by the reflector on the feed 107 in a receive direction. Accordingly, the combination of the RF feed 107 and the reflector system 100 can facilitate a reflector type antenna system. The housing 102 may have various configurations and sizes depending on the size of the reflector system 100.

The reflector system 100 includes a rigid structural base 103. In some scenarios, the rigid structural base can comprise a base tube 128 for an extendable boom 104. The boom 104 has a stowed configuration show in FIG. 1 in which the boom is compactly arranged for stowage. The stowed configuration is useful when the reflector system is being transported to an orbital location for deployment. The boom 104 can advantageously transition to a deployed condition shown in FIG. 2. In the deployed condition, the boom is extended from the base 103 to define an elongated boom length.

The structural base 103 can also serve as a rigid mounting point for various other components associated with the deployment system. These components can include an actuator mechanism 122 which is coupled to a drive train 124. The actuator or drive mechanism is configured to deploy the boom from the compact stowed condition to the deployed condition. The actuator 122 can include any type of system that uses energy to apply a force for causing the boom to extend. An example of a suitable actuator can include a motor 122 (such as an electric motor) that is coupled to a mechanical drive train 124. Other types of motors such as a hydraulic or pneumatic motor could also be used for this purpose. In some scenarios, the drive train 124 can be mechanically coupled to one or more of the elements which comprise the boom for purposes of urging the boom to extend at deployment time. Other types of actuators can also be used to deploy the boom from the compact stowed configuration to the deployed configuration. For example, the actuator could be an electrically operated actuator, a spring operated actuator, a pneumatic actuator, and/or a hydraulic actuator, without limitation.

The exact configuration of the drive train 124 will depend in part upon the design of the boom. In the example shown in FIGS. 1-3 the boom is comprised of a plurality of a tubular sections 126 which nest within the base tube 128 of base structure 103. In order to extend the boom the tubular sections 126 are urged to a condition in which the tubes are disposed substantially end to end. Different type of drive trains include, but are not limited to leadscrews, cables and pulley arrangements, or a spoolable extensible member (SEM) that is capable of transferring power from the actuator to the boom in order to extend to the deployed length.

The boom 104 has a carrier end 105 which is disposed on a portion thereof which is distal from the rigid base structure 103 when the boom is extended. Mounted to the carrier end 105 is a reflector support structure 106. A support bracket 120 can be secured to the boom and the reflector support structure 106 to secure the reflector support structure to the boom. In the example shown in FIGS. 1-3, the reflector support structure 120 is comprised of a hoop in the form of a perimeter truss assembly. In some scenarios, the perimeter truss assembly can include a plurality of pantographic structural elements 109, 111 which pivot on link ends 113, 115. The pantographic operation of the structural elements 109, 111 can allow a perimeter defined by the perimeter truss assembly to increase and/or decrease under certain conditions.

The reflector support structure 106 has a collapsed configuration in which the reflector support structure is arranged for compact stowage. The collapsed configuration can be understood with reference to FIG. 1 which shows the reflector compactly stowed within a portion of the spacecraft housing 102. In the example shown in FIGS. 1-3, the pantographic structural elements 109, 111 can be disposed substantially parallel to each other and aligned with a central reflector axis 118 when the reflector support structure in the collapsed configuration.

The reflector support structure 106 also has an expanded configuration which is shown in FIG. 2. In the expanded configuration, the perimeter defined by the reflector support structure is substantially increased as compared to the collapsed configuration. When fully expanded, the reflector support structure 106 facilitate support of a reflector surface 112 in accordance with a predetermined reflector shape. In some scenarios, when the reflector support structure is fully deployed, the central reflector axis 118 of the reflector can be laterally offset in position by a predetermined distance d relative to a central axis of the extendable boom aligned along its elongated length.

The reflector surface 112 can be comprised of a metalized film or a mesh material (such as a conductive metal mesh) that is highly reflective of RF energy. The predetermined reflector shape is advantageously chosen so that the reflector surface will concentrate RF energy in a predetermined direction or pattern. As such, the reflector surface can have any shape or curvature that is suitable for a particular antenna application. For example, the reflector surface can be flat or parabolic. In other scenarios, the reflector surface can be specially shaped in accordance with the needs of a particular reflector design. For example, in some scenarios the reflector surface can be specially shaped in accordance with a predetermined polynomial function. Further, the reflector surface 112 can be a surface of revolution, but it should be understood that this is not a requirement. There are some instances when the reflector surface can be an axisymmetric shape. Methods of shaping the reflector are well known and will not be described here in detail. In the case of a perimeter truss assembly a network of catenary cords and tie cords can be used for this purpose. However, it should be understood that the solution is not limited with regard to the particular shaping technique that is used. All such methods, whether now known or known in the future can be utilized with the solution described herein.

The system also includes a tension element 110. The tension element can be secured to an anchor 130 that is fixed to the base structure 103. The tension element 110 can be any suitable structural element that is capable of communicating a tension force along its length. For example, the tension element can be a cord or a tape that is capable of facilitating the tension force. The tension element 110 extends within or beside the boom 104 to the carrier end 105 of the boom, where a tension guide element 132 is used to guide the tension element to the reflector support structure 106. The tension guide element can in some scenarios be comprised of a pulley, a cam-shaped member, or other type of guide member having a low friction guide surface. In some scenarios, the tension element 110 can be comprised of a single continuous element. However, the solution is not limited in this respect and in other scenarios the tension element 110 can be comprised of a plurality of elements that are connected end to end at various locations along the length of the tension element 110.

In the scenario shown in FIGS. 1-3, the tension element 110 can extend from the tension guide element 132 to then traverse along the perimeter of the reflector support structure 110. For example, the tension element 110 can be aligned along a length of each pantographic structural element 111 and arranged to traverse a distance between opposing link ends 113, 115 of the pantographic structural elements 109, 111. Guide members 134, 136 can be disposed on link ends 113, 115 to help guide the tension element 110 along the path described herein. A distal end portion 138 of the tension element 110 is secured to a portion of the reflector support structure 106 at a point where the tension element has traversed substantially the entire perimeter of the reflector support structure 106. With reference to FIG. 3 it can be understood that a tension force applied by tension element 110 will urge opposing link ends together such that the perimeter of the reflector support structure 106 can be increased to form the desired reflector shape.

Figure 4B:
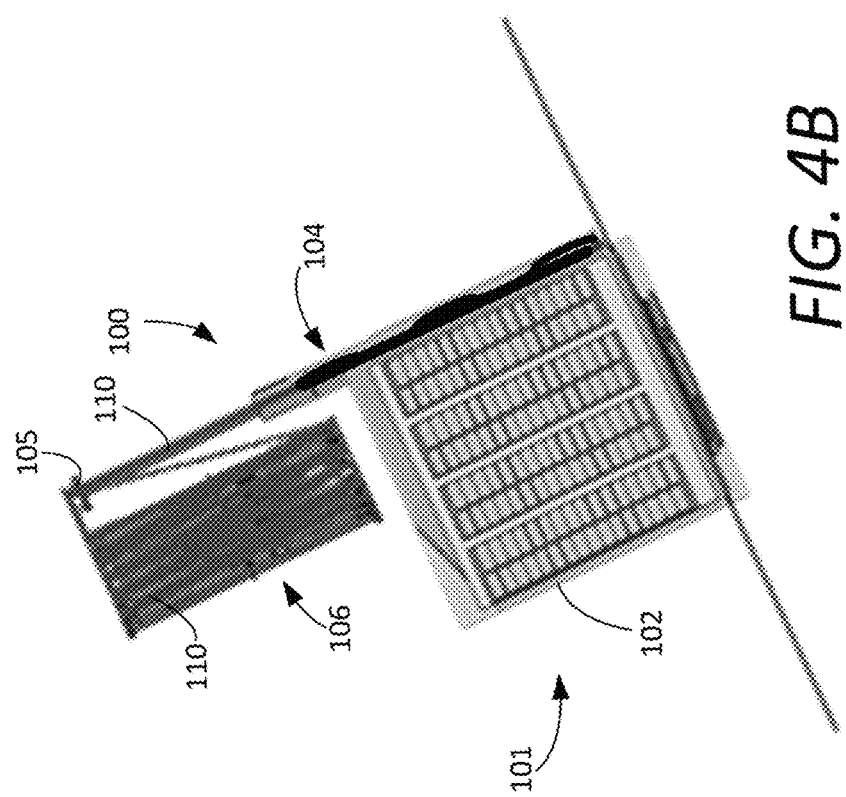
FIGS. 4A-4C (collectively FIG. 4) are a series of drawings which are useful for understanding a deployment process for the reflector system shown in FIG. 1.
Figure 4A:
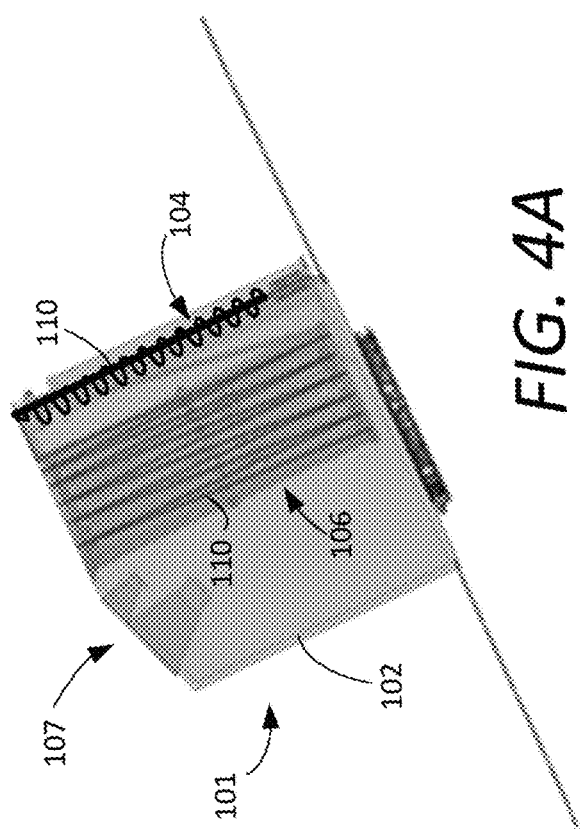
Figure 4C:
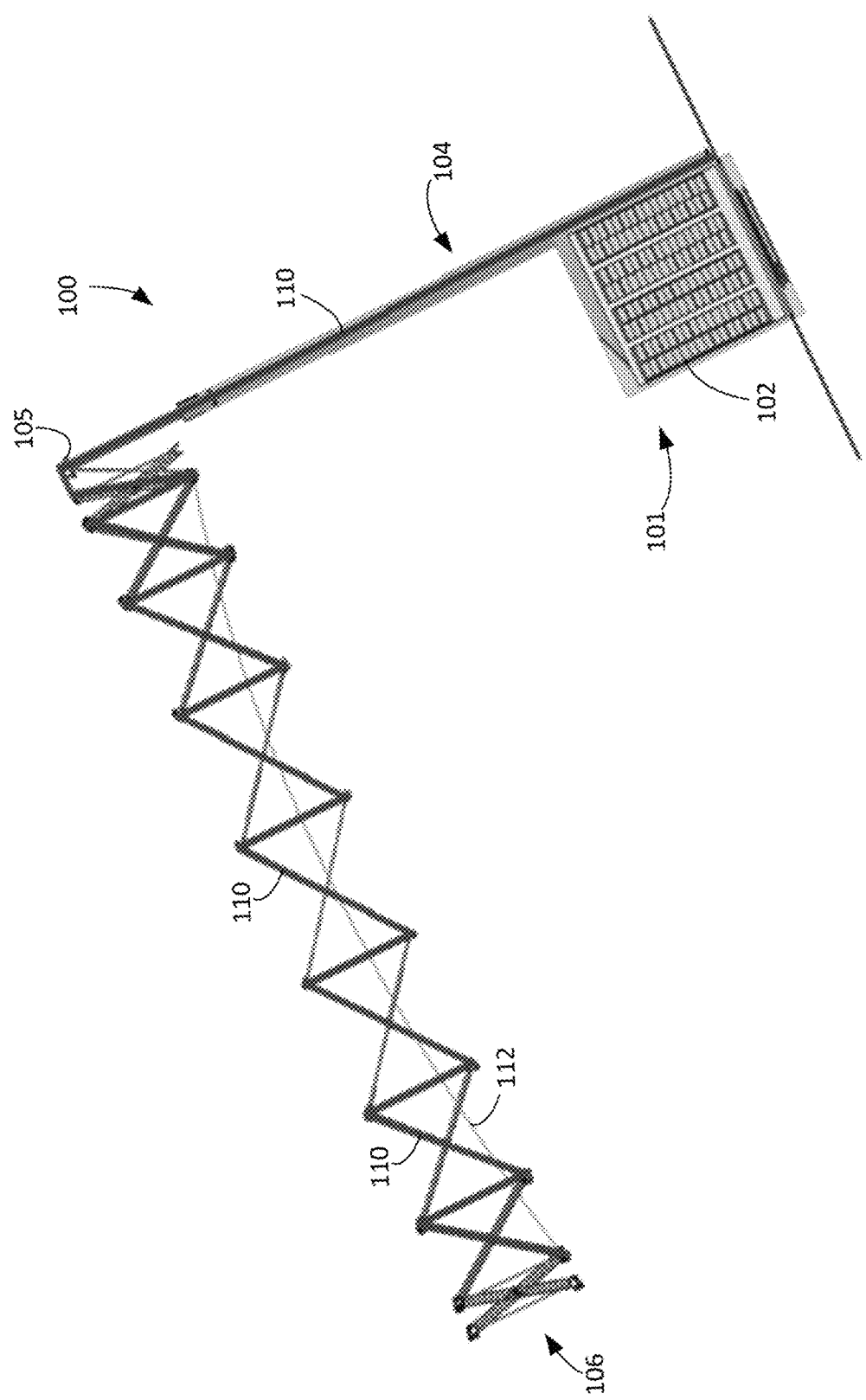

According to one aspect of a solution disclosed herein, the actuator which facilitates deployment of the boom 104 performs a dual function. In addition to causing the boom to extend, the same actuator will concurrently facilitate deployment of the reflector support structure 106. An example of such a dual function operation of the actuator can be understood with reference to the series of drawings in FIGS. 4A-4C. The process begins as shown in FIG. 4A with the reflector support structure 106 in its collapsed configuration and the boom 104 in its stowed configuration. With the system in this condition, the tension element 110 will be slack so that it does not exert a force on the pantographic elements comprising the reflector support structure. When the reflector system 100 is to be deployed, the operation of the actuator system will be initiated so that the carrier end 105 of the boom 104 begins to extend away from the base structure 103. This condition is illustrated in FIG. 4B which shows that the slack in tension element 110 has been substantially eliminated. The distal end portion 138 of the tension element 110 is secured to a portion of the reflector support structure. Consequently, any further extension of the boom 104 beyond that which is shown in FIG. 4B will necessarily begin to load or apply tension to the tension element 110.

As the boom 104 continues to extend, the portion of the tension element 110 that is disposed within or alongside the length of the boom 104 will necessarily increase. This will leave a decreasing length of the tension element 110 to traverse the perimeter of the reflector support structure 106. Consequently, the opposing link ends 113, 115 of the pantographic elements will be urged toward each other in the directions indicated by the arrows 140 in FIG. 3. This will result in expansion of the perimeter of the reflector support structure 106 to result in the fully deployed condition shown in FIG. 4C. Consequently, the reflector support structure 106 is automatically transitioned from the collapsed configuration to the expanded configuration responsive to the tension force.

Figure 5:
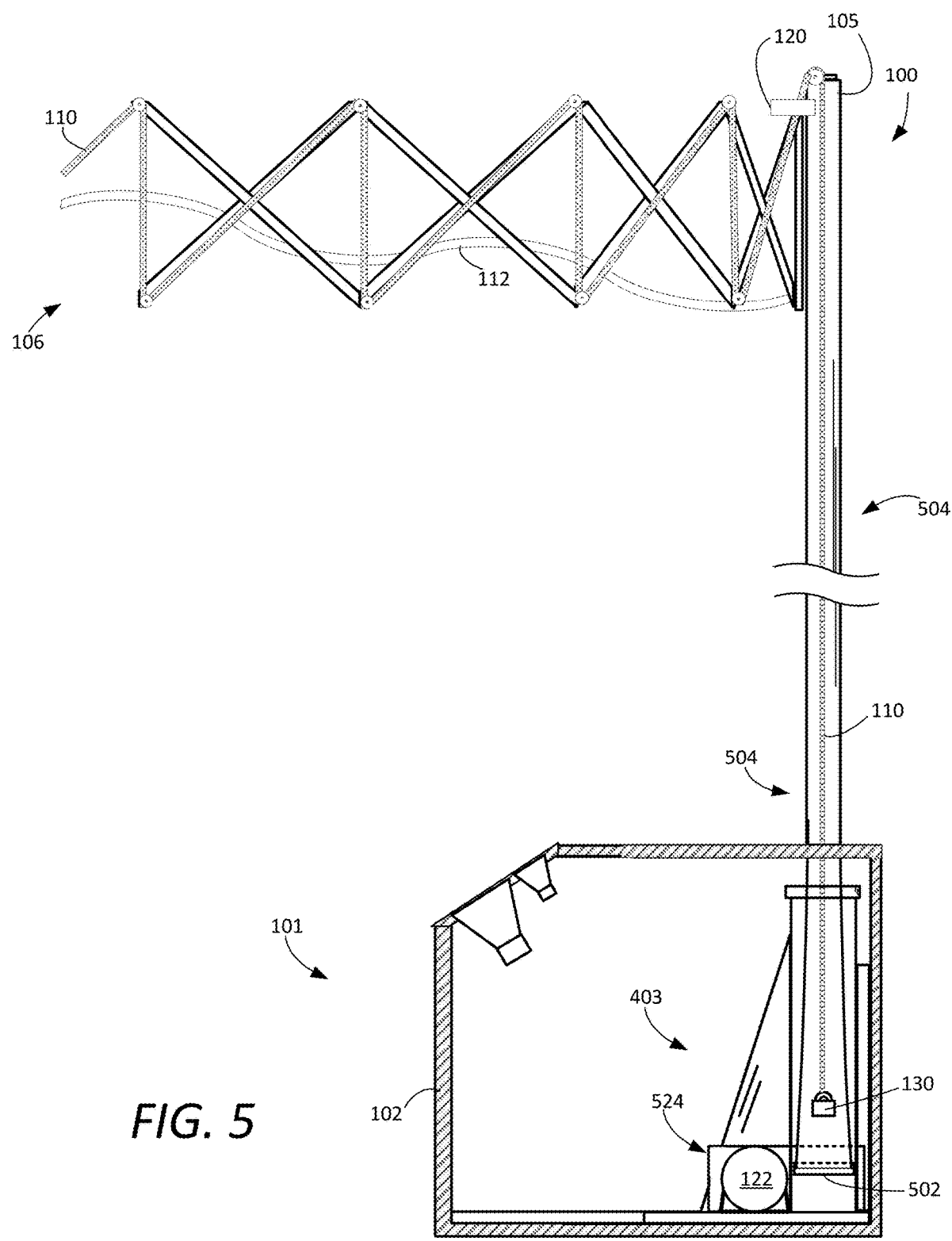
FIG. 5 is a drawing which is useful for understanding an alternative embodiment reflector system which uses a storable extendable member to form a boom.

In the solution disclosed in FIGS. 1-4, the boom 104 is comprised of a plurality of tubular sections 126 which are nested together in the stowed condition, and which extend substantially end to end in the deployed condition. However, it should be understood that the boom is not limited in this regard and other boom configurations are also possible. For example, FIG. 5 shows a scenario in which a boom 504 is comprised of a spoolable extensible members (SEM). SEMs are well-known in the art and therefore will not be described here in detail. However, it will be appreciated that an SEM can comprise any of a variety of deployable structure types that can be flattened and stowed on a spool for stowage, but when deployed or unspooled will exhibit beam-like structural characteristics whereby they become stiff and capable of carrying bending and column loads. Deployable structures of this type come in a wide variety of different configurations. Examples of conventional SEMs include slit-tube or Storable Tubular Extendible Member (STEM), Triangular Rollable and Collapsible (TRAC) boom, Collapsible Tubular Mast (CTM), and so on. In FIG. 5 the SEM 504 can be disposed on a spool 524 which is rotated by a motor 122. The rotation of the spool dispenses the SEM 504 through a slot 502, after which the SEM will conform to its rigid deployed state as it extends from a base structure 403.

Figure 6:
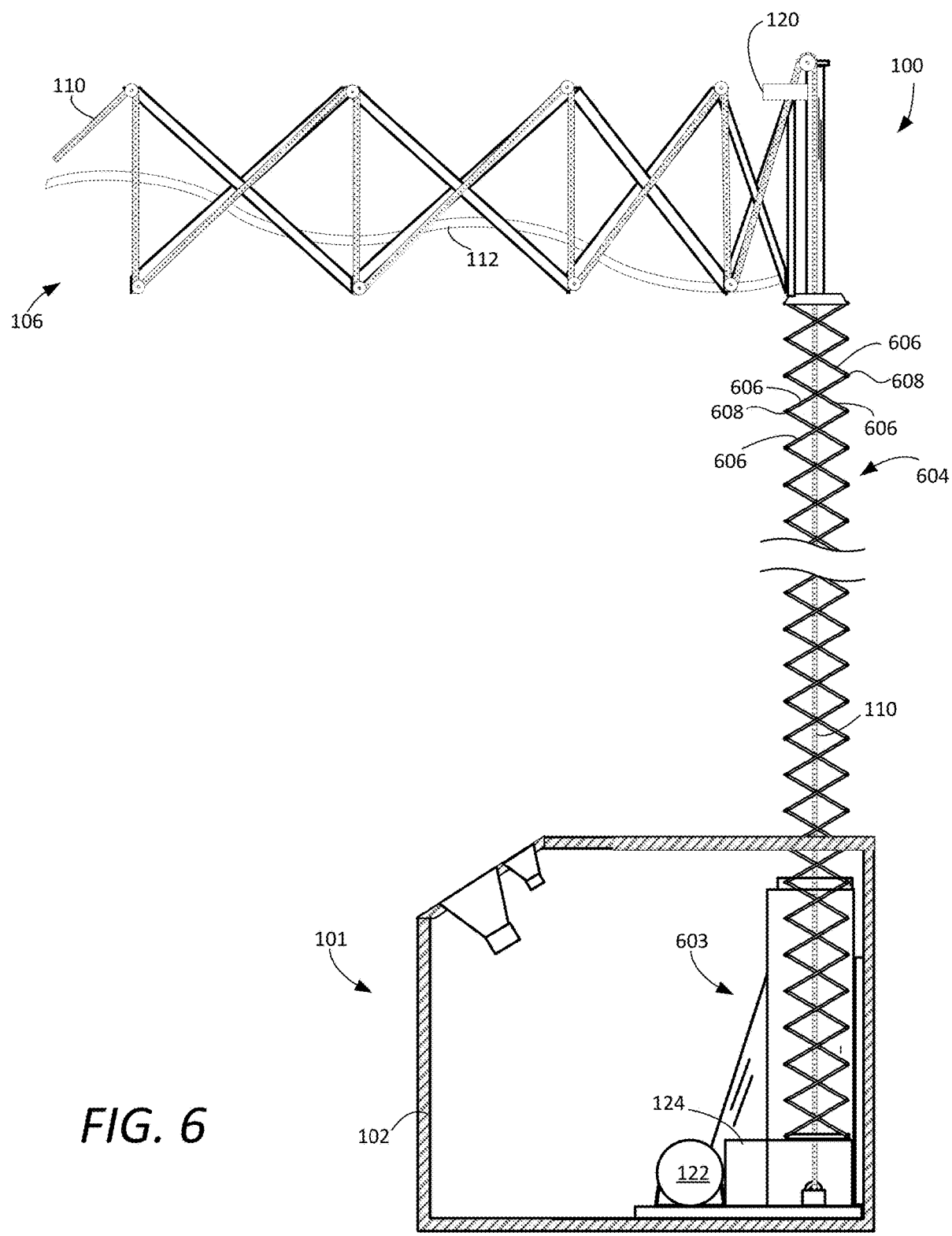
FIG. 6 is a drawing which is useful for understanding an alternative embodiment reflector system which uses a boom comprised of a pantographic member.

In an alternative scenario, the boom can have a pantograph configuration. Such a configuration is shown in FIG. 6 in which the boom 604 include a plurality of link members 606 joined by hinges 608. The link members and hinges can comprise a plurality of sections which operate in accordance with a scissoring action to cause the boom 604 to extend. For example, the boom can transition between a collapsed configuration wherein the link members 606 pivot to extend substantially parallel to one another and an expanded configuration wherein the link members align substantially co-linear to one another. The pantograph deployment can be driven with any of the linear deployment methods previously discussed, or through a linkage that rotates in response to the drive or actuator.

Similarly, it should be understood that the exact configuration of the reflector support structure 106 is not critical to the solution. In FIGS. 1-4, the reflector support structure 106 is a perimeter truss assembly comprising a plurality of pantograph sections which are configured to operate in accordance with a scissoring action. However, the solution is not limited in this regard and other types of reflector support structures can also be used, provided that they are capable of being deployed in response to a tension force applied by a tension element 110. For example, a different type of pantograph type hoop reflector support structure which can be used with the solution described herein is disclosed in U.S. Pat. No. 9,153,860 B2, the entirety of which is incorporated herein by reference.

Figure 7A:
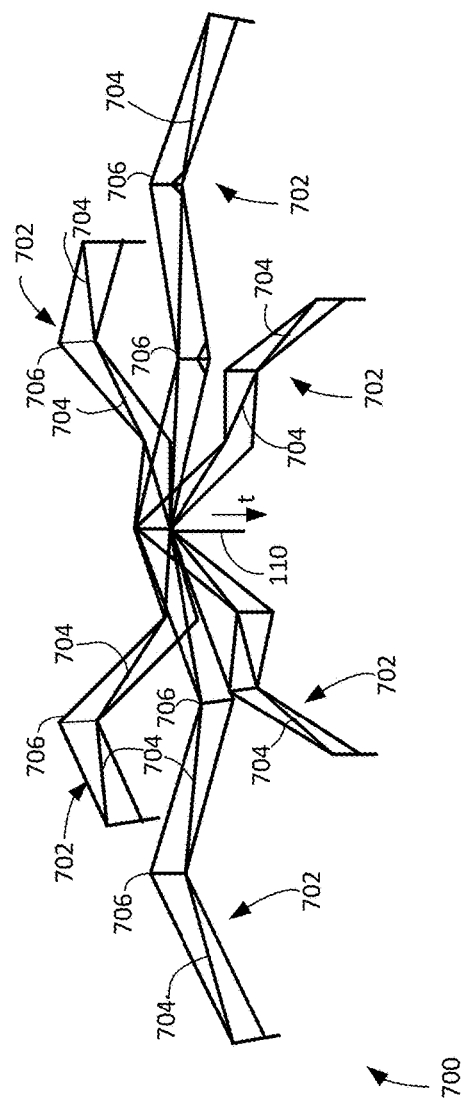
FIGS. 7A and 7B are a set of drawings which are useful for understanding
Figure 7B:
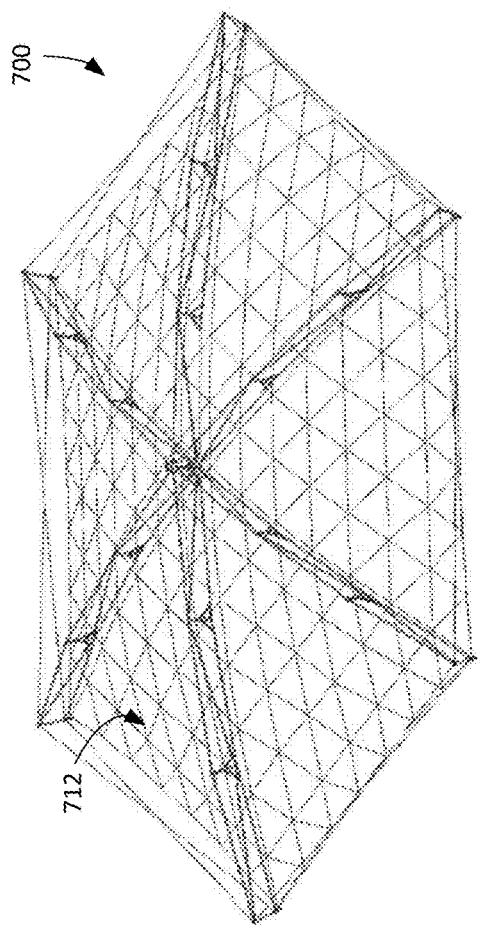

In other scenarios, the reflector support structure can employ a plurality of radial ribs instead of utilizing a hoop configuration. For example, FIG. 7A shows a reflector support structure 700 comprised of a plurality of foldable ribs 702. Each foldable rib is configured as a deployable truss which can be folded at hinges 706 as shown to facilitate compact stowage of the reflector. A tension element 110 can be coupled to a plurality of rib cords 704, where one rib cord is associated with each of the ribs 702. The rib cords can extend along a length of each rib 702. When a tension force is applied to the rib cords 704, the ribs 702 are caused to unfold to the expanded reflector configuration shown in FIG. 7B whereby a mesh reflector surface 712 is fully supported. Other types of stowable reflector configurations which can be used with the solution include designs employing rigid ribs which deploy in the manner of an umbrella. Additional details pertaining to the reflector configuration shown in FIG. 7A-7B can be found in U.S. Pat. No. 9,774,092 B2, the entirety of which is incorporated herein by reference.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A deployable reflector system, comprising:
a boom configured to transition from a stowed condition in which the boom is compactly arranged for stowage, to a deployed condition in which the boom is extended to define an elongated boom length, the boom including a base tube and a carrier end which is disposed distal from the base tube when the boom is extended;
a reflector support structure secured to the carrier end, the reflector support structure configured to transition from a collapsed configuration in which the reflector support structure is arranged for compact stowage, to an expanded configuration in which the reflector support structure supports a reflector surface in accordance with a predetermined reflector shape;
an actuator configured to concurrently (i) urge the boom from the compact stowed condition to the deployed condition and (ii) facilitate deployment of the reflector support structure; and
a tension element coupled at a first end to the reflector support structure and secured at a second opposing end by an anchor located adjacent to the base tube of the boom, the tension element automatically urgable from a condition of slack to a condition of tension as the actuator urges the boom to the deployed condition;
wherein the reflector support structure is configured to automatically transition from the collapsed configuration to the expanded configuration when the tension element is being urged from the condition of slack to the condition of tension.

2. The deployable reflector system of claim 1, wherein the tension element is configured to extend along a length of the boom to a tension guide element disposed at the carrier end of the boom, the tension guide element is configured to cause the tension element to extend away from the boom in a direction angled relative to the length of the boom.

3. The deployable reflector system of claim 2, wherein the tension guide element is selected from the group consisting of a pulley and a cam.

4. The deployable reflector system of claim 1, wherein the tension element is selected from the group consisting of a cord and a tape.

5. The deployable reflector system of claim 1, wherein the actuator is comprised of a motor.

6. The deployable reflector system of claim 1, wherein the boom is comprised of a plurality of sections which are nested together in the stowed condition, and which extend substantially end to end in the deployed condition.

7. The deployable reflector system of claim 1, wherein the boom is comprised of a plurality of sections which are configured to operate in accordance with a scissoring action.

8. The deployable reflector system of claim 1, wherein the extendable boom is comprised of a member extensible from a spool.

9. The deployable reflector system of claim 1, wherein the reflector support structure is a perimeter truss assembly comprising a plurality of link members which define a pantograph.

10. The deployable reflector system of claim 1, wherein the reflector support structure is a comprised of a plurality of foldable ribs which, when unfolded are disposed radially with respect to a central axis of the reflector support structure.

11. A method for deploying a reflector system, comprising:
using an actuator to concurrently (i) urge a boom from a stowed configuration to an extended configuration and (ii) facilitate deployment of a reflector support structure;

urging a tension element to a condition of tension by taking up a slack in the tension element as the actuator urges the boom to the extended configuration; and using the condition of tension to urge the reflector support structure to transition from a collapsed configuration in which the reflector support structure is arranged for compact stowage, to an expanded configuration in which the reflector support structure supports a reflector surface in accordance with a predetermined reflector shape;

wherein the tension element includes a first portion disposed in alignment with a boom central axis, and a second portion extending along a part of the reflector support structure, the method further comprising increasing a length of the first portion and decreasing a length of the second portion, responsive to extending the boom.

12. The method according to claim 11, further comprising using the decreased length of the second portion to urge the reflector support structure to the expanded configuration.

13. The method according to claim 11, further comprising anchoring the tension element to a rigid structural base which supports the boom.

14. A method for deploying a reflector system, comprising:

using an actuator to concurrently (i) urge a boom from a stowed configuration to an extended configuration and (ii) facilitate deployment of a reflector support structure;

urging a tension element to a condition of tension by taking up a slack in the tension element as the actuator urges the boom to the extended configuration;

using the condition of tension to urge the reflector support structure to transition from a collapsed configuration in which the reflector support structure is arranged for compact stowage, to an expanded configuration in which the reflector support structure supports a reflector surface in accordance with a predetermined reflector shape; and transitioning the reflector to an expanded configuration by controlling relative positions of a plurality of pantographic link members which form a pantograph hoop.

15. The method according to claim 11, further comprising transitioning the reflector to the expanded configuration by unfolding a plurality of foldable ribs so that they extend radially with respect to a central axis of the reflector support structure.

16. The method according to claim 11, further comprising extending the boom by urging a plurality of coaxially disposed sliding sections so that they are disposed substantially end to end.

17. The method according to claim 11, further comprising extending the boom by unspooling an extensible member.

* * * * *